Dec. 3, 1957 E. J. DE WITT 2,814,913
COMBINATION CUTTING AND DEBURRING TOOL
Filed March 7, 1955 2 Sheets-Sheet 2

INVENTOR.
Edward J. DeWitt,
BY
Cromwell, Greist + Warden
Attys

United States Patent Office 2,814,913
Patented Dec. 3, 1957

2,814,913

COMBINATION CUTTING AND DEBURRING TOOL

Edward J. De Witt, Winnetka, Ill., assignor to Wallace Supplies Manufacturing Company, Chicago, Ill., a corporation of Illinois Application March 7, 1955, Serial No. 492,490

11 Claims. (Cl. 51—5)

This invention relates to power driven tools and is more particularly concerned with improvements in a combination tool for use in cutting tubes, angles, strips and similar work pieces and for removing the burr which remains after the cutting operation.

It is a general object of the invention to provide an improved tool which comprises a motor driven cut-off wheel and a device for removing the burr which is commonly formed on the cut edge of a pipe or the like which is severed by the cut-off wheel.

It is a more specific object of the invention to provide a combination cut-off saw and deburring mechanism which consists of a drive motor mounted adjacent one end of a supporting arm which is pivoted on a work supporting table, the motor having one end of its shaft connected in driving relation with a cut-off blade which is rotatably mounted on the end of the pivoted arm on which the motor is supported and having a wire brush on the other end of the drive shaft which is enclosed in a housing provided with an aperture for supporting the end of a work piece which has been severed by the cut-off wheel in order to subject the cut edge of the work piece to the action of the wire brush for removal of the burr which remains on the same after the cutting operation.

It is a further object of the invention to provide a cut-off tool in which a drive motor is mounted on a a pivotally supported bracket on a work table in spaced relation to a clamping mechanism for securing a work piece in fixed position thereon, an abrasive cut-off wheel is rotatably mounted on one end of the bracket and connected in driving relation with one end of the motor shaft, the other end of the motor shaft is extended into a housing adjoining the motor and carries a wire brush which is adapted to remove the burr remaining on the cut edge of a tube or similar work piece after it has been severed by the cut-off wheel.

It is another object of the invention to provide in a tool of the type described a work supporting table and a quick acting clamp for securing a work piece thereon which comprises a fixed work supporting abutment and a pair of pivotally mounted jaw members which are connected to an operating cam adapted to be manually rotated to bring the clamp ends of the jaw members into engagement with the work piece and clamp the same against the fixed abutment.

These and other objects and advantages of the invention will be apparent from a consideration of the apparatus which is shown by way of illustration in the accompanying drawings, wherein:

Fig. 4 is a sectional view taken on the lines 4—4 of Fig. 3 with the clamp members shown in clamping position;

Fig. 5 is a fragmentary side elevation to an enlarged scale, illustrating the removal of the burr from a cut end of a tubular member; and Fig. 6 is a fragmentary side elevation of the cut and of a tubular member after the burr has been removed.

Figure 1:
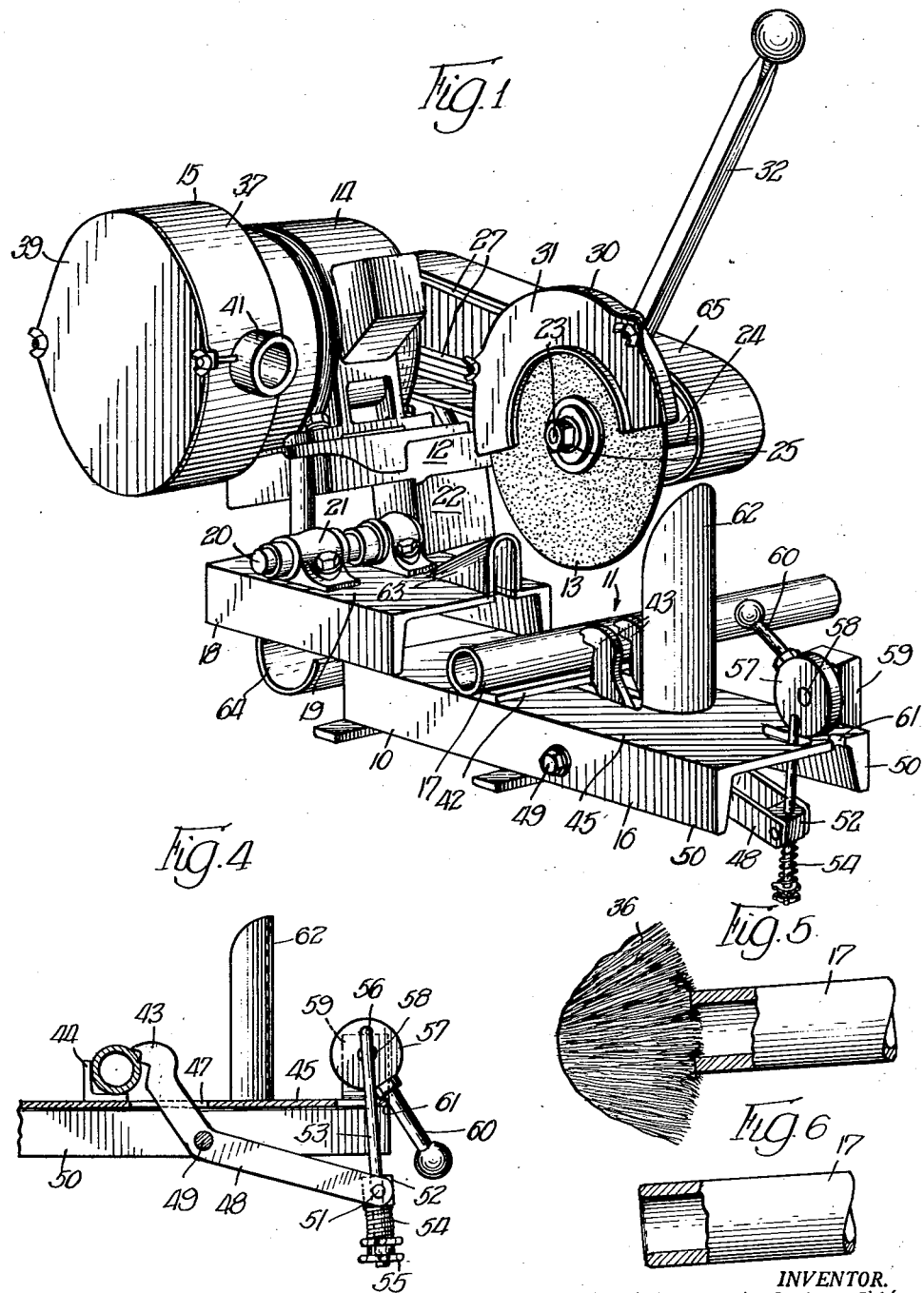
Fig. 1 is a perspective view of a combination cut-off and deburring tool which incorporates therein the principal features of the invention.

Referring to the drawings there is illustrated a mechanism which embodies therein the principal features of the invention and which comprises a supporting frame or base 10 having a clamp mechanism indicated at 11 for securing a work piece in fixed relation thereon, an elongate arm or platform member 12 which is mounted intermediate its ends for tilting movement relative to the supporting frame 10, a cut-off blade 13 rotatably mounted at one end of the arm 12, an electric motor 14 adjacent the other end of the arm 12 having one end of its shaft connected in driving relation with the cut-off blade 13 and a deburring apparatus 15 at the other side of the motor 13 which is driven from the other end of the motor shaft.

The forward portion or section 16 of the supporting frame or base 10 is in the form of a downwardly opening channel member and is adapted to support a length of pipe or other work piece 17. The rear section 18 of the frame 10 is also channel-shaped and supports on the upwardly facing surface or back 19 of the web thereof a transversely extending pivot shaft 20, the latter being journaled in a pair of laterally spaced bearings 21. A supporting post or block 22 extends upwardly of the bearing shaft 20 and supports the elongate arm or platform member 12 at a point intermediate the ends thereof. At its forward end the arm 12 is provided with a cross shaft 23 extending transversely of the machine and mounted in suitable bearings, indicated at 24. The shaft 23 carries clamping elements 25 on one end for receiving and securing thereon the cutting element 13 which may be an abrasive cutting blade or wheel. At its other end the cross shaft 23 is provided with a pulley 26 which is connected by means of a pair of belts 27 in driving relation with a pulley 28 on the drive shaft 29 of the motor 14. A housing 30 is secured on the end of the supporting arm 12 which is provided with a removable plate 31, and which forms a protective cover for the top of the cutting blade 13. A handle 32 is secured adjacent the forward end of the arm 12 and extends upwardly at an angle thereto for manual operation of the saw blade.

The motor 14 is mounted on an adjustable motor support 33 which is positioned to the rear of the pivot shaft 20 and which is adjusted so that the weight of the motor 14 and the deburring apparatus 15 normally holds the arm 12 in a downwardly and rearwardly tilted position. A stop member 34 projecting upwardly of the surface 19 of the rear frame section 18 limits the rearward tilting movement of the arm 12 while an adjustable stop pin 35 also projecting upwardly of frame section 18 limits the forward tilting movement.

The deburring apparatus 15 comprises a wire wheel 36 which is mounted on the end of the motor shaft 29 opposite the pulley 28 and a circular housing 37 which is secured by brackets 38 to the frame of motor 15 and which has a removable face plate 39. The housing 37 is provided with a work receiving aperture 40 on its peripheral surface and a short tubular section 41 which is in communication therewith and extends forwardly thereof towards the front of the machine, preferably at a slight upward angle relative to the axis of rotation of the cutting blade 13. The tubular section 41 has an internal diameter sufficient to accommodate the largest size work piece which the machine is adapted to handle and forms a support for resting the end of the work piece thereon while it is manually rotated about its own longitudinal axis to subject the cut end to the deburring action of the wire brush 36 (Fig. 5).

The work clamping mechanism 11 comprises an angle member 42 which extends transversely of the base frame 16 beneath the cut-off blade 13 with its open side towards the front of the machine and is adapted to support the work piece 17. The latter is adapted to be clamped in position by a pair of clamp jaws 43 which cooperate with the fixed support member 42. The work support member 42 is slotted at 44 to accommodate the blade 13 and the top or table forming web portion 45 of the frame member 16 is provided with a cooperating aligned slot 46 for accommodating the cutting blade 13. The top member 45 of the base frame member 16 is also slotted at 47 to accommodate the clamping jaws 43 which are mounted for swinging movement therein.

Figure 2:
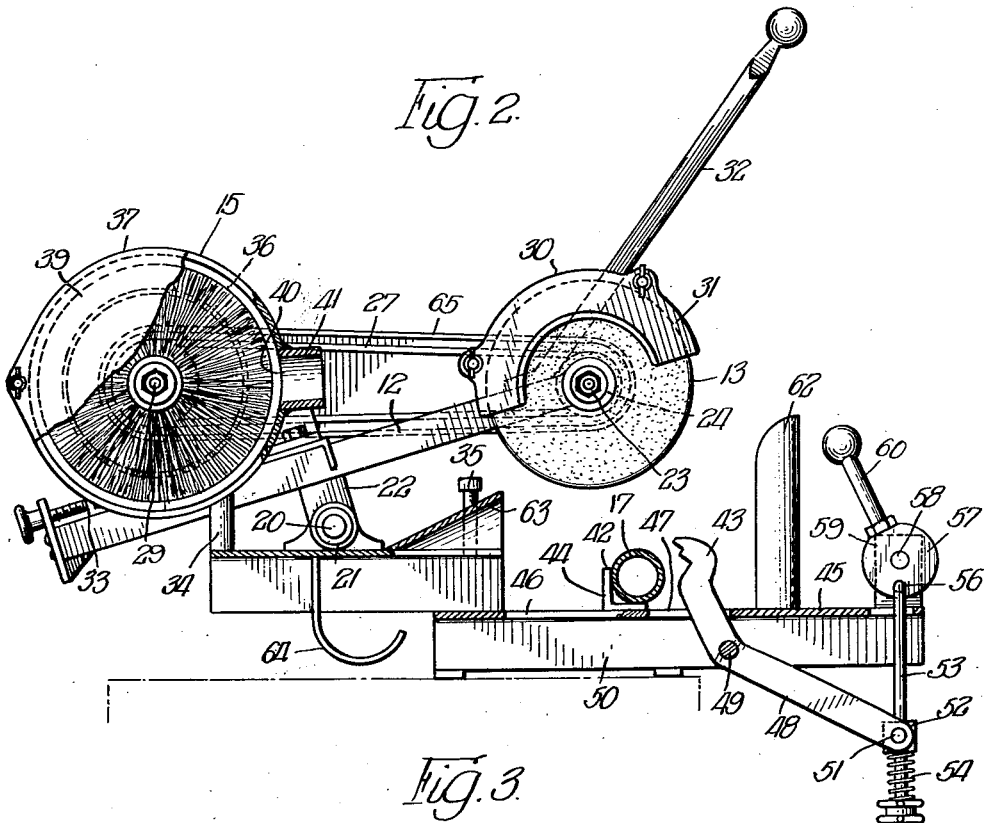
Fig. 2 is a side elevation of the tool with portions thereof shown in section.
Figure 3:
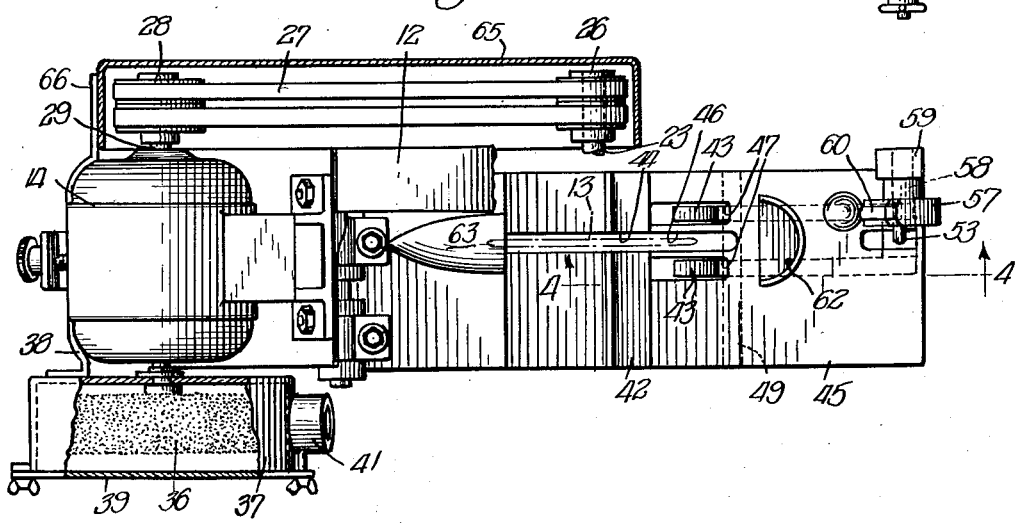
Fig. 3 is a plan view of the tool with portions thereof broken away.

The clamping jaws 43 are formed on the ends of supporting arms 48 which are pivoted on a cross rod 49 extending between the side flanges 50 of the base frame member 16. At their other ends the arms 48 are pivotally connected at 51 on opposite sides of a relatively small block 52 which is slidably mounted on a vertically extending rod 53. The slide block 52 is urged in the upward direction by a compression spring 54 which is positioned between the block 52 and the clamp nuts 55 at the bottom end of the rod 53. The upper end of the rod 53 is pivotally connected at 56 to a cam plate or disc 57 which is supported on a relatively small stub shaft 58 extending inwardly of a bearing bracket member 59 which is supported in upstanding relation on the base frame member 16 adjacent the front end thereof. The eccentric plate 57 is provided with a handle 60 attached to its periphery which permits manual rotation thereof from an open or non-clamping position as shown in Figs. 1 and 2 to a closed or clamping position as shown in Fig. 4 where the operating handle 60 engages in a slot 61 in the edge of the base support member 16.

A chip guard 62 is arranged in upstanding relation in front of the cut-off wheel 13 while a chip guard or guide 63 is provided at the front of the rear section 18 of the frame member 10 which directs the chips from the cut-off wheel 13 into a trough 64 which is provided beneath the same. A safety cover member or housing 65 is preferably mounted over the drive belts 27 and pulleys 26, 28 by means of a bracket 66 which is secured to the motor housing.

In using the apparatus a piece of pipe 17 or other metal angle or bar member which is to be cut is positioned on the work supporting member 42 and clamped thereon by movement of the clamping jaws 43 through manual operation of the eccentric plate 57. The sliding block 52 and spring 54 at the end of the actuating arm 53 permits considerable variation in the size of the member or work piece which may be clamped in position for the cutting operation. Thereafter the operator grasps the operating handle 32 and rocks the swinging arm 12 forwardly and downwardly about its pivot shaft 20 into cutting position where the blade 13 engages with the work piece 17 in a cutting plane between the clamp members 43. The blade 13 is retracted after it has passed through the work piece 17 by allowing the arm 12 to pivot backwards about the shaft 20 to its non-cutting position where the rear end thereof rests on the stop 34. The motor 15 may be allowed to run to drive the shaft 29 and operate the deburring wheel 36 and the cut end of the work piece 17 may then be inserted by the operator through the support 41 and the aperture 40 into engagement with the wire wheel 36 which removes the burr from both the inner and outer edges of the cut surface as the work piece 17 is rotated by the operator (Figs. 5 and 6).

While specific materials and particular details of construction have been referred to in describing the illustrated form of the apparatus it will be understood that other materials and other details of construction may be resorted to within the spirit of the invention.

I claim:

1. A combination cut-off and deburring mechanism comprising a supporting frame, a supporting platform pivotally mounted for tilting movement on the frame, a drive motor mounted at one end of the platform, a blade supporting shaft extending transversely of the other end of the platform, a driving connection between one end of the motor shaft and the blade supporting shaft for operating the blade, a deburring mechanism supported on the motor at the other end of the motor shaft, said deburring mechanism including a housing and a wire brush enclosed therein, a drive connection between the motor shaft and the wire brush, said housing having a peripheral aperture opening in the direction of the cut-off blade for receiving the end of a work piece to permit the operator to engage the same with the periphery of the wire brush.

2. A combination cut-off wheel and deburring mechanism comprising a supporting frame, an elongate platform pivotally mounted intermediate its ends on the frame, a drive motor mounted at the rear end of the platform, a cut-off wheel supporting shaft extending transversely of the forward end of the platform, a driving connection between one end of the motor shaft and the cut-off wheel supporting shaft for operating the cut-off wheel, and a deburring mechanism mounted on the motor, said deburring mechanism including a wire brush mounted on the other end of the motor shaft, and a cradle member mounted adjacent the wire brush and between the wire brush and the cut-off wheel for supporting the end of a work piece to permit the operator to engage the same with the periphery of the wire brush.

3. In a cut-off mechanism, a supporting frame, a pivotally mounted transverse shaft journaled in bearings on the frame, a pivoted arm secured intermediate its ends to said shaft, a motor mounted at the rear end of said arm with its drive shaft extending transversely of the machine, a transverse shaft journaled at the forward end of the pivot arm, a cut-off wheel on said transverse shaft, a drive connection between the motor shaft and said cut-off wheel shaft for driving the same, a housing at the opposite side of said motor through which the motor shaft extends, a wire brush on the motor shaft and enclosed within the housing, and an aperture in the forward side of the periphery of the housing for receiving the cut-off end of the work piece whereby the end of the work piece may be engaged with the wire brush.

4. A cutting and deburring apparatus comprising a supporting frame, an elongate platform pivotally mounted intermediate its ends on a transverse axis thereon, a motor mounted at one end of said arm with its drive shaft extending transversely of said machine, a transverse shaft at the other end of said platform, a cut-off wheel mounted on said transverse shaft and a driving connection between the cut-off wheel shaft and the motor shaft, a wire brush at the other end of the motor shaft, means connecting the motor shaft to the wire brush, and a circular housing enclosing the wire brush, said housing having an aperture in the periphery thereof which opens in the direction of the cut-off wheel through which the cut-off end of a work piece may be inserted for engagement with the periphery of the brush, and means on the supporting frame beneath the cut-off wheel for holding a work piece to be cut off by said cut-off wheel.

5. A work supporting table for a cut-off saw having a saw slot and two parallel clamp receiving slots, a work engaging abutment member extending transversely of said slots, a pair of clamp members pivotally mounted on said table for rotation about a transverse axis and having jaw members at one end extending upwardly through the clamp receiving slots for cooperation with the work engaging abutment member on the table to clamp a work piece against the same, and eccentric means having a resilient connection with the other end of said clamping members for moving said clamping jaw members toward and from said abutment member.

6. A work supporting table for a cut-off saw having a saw slot and two parallel clamp receiving slots, a work supporting angle bar extending transversely of said slots, a pair of clamping members pivotally mounted on a transverse axis and having jaw members extending upwardly through the clamp receiving slots for cooperating with the work supporting angle bar on the table, said clamping members extending downwardly of their pivotal mounting, a pivot block connected to said clamping members, a generally vertical rod slidably connected to the pivot block, a manually rotatable eccentric mounted on the table and said rod being connected to said eccentric.

7. A work supporting table for a cut-off saw having a saw slot and two parallel clamp receiving slots, a work supporting abutment member extending transversely of said slots, a pair of clamping members pivotally mounted on a transverse axis and having jaw members extending upwardly through the clamp receiving slots for cooperation with the work supporting abutment member on the table, said clamping members extending downwardly from their pivotal mounting and connected to an apertured pivot block, a generally vertical rod slidable in the aperture in the pivot block, a compression spring between the pivot block and the lower end of the rod, an eccentric rotatably supported on the table, the upper end of the rod being connected to said eccentric, and a handle on the eccentric for manually rotating the same.

8. In a work supporting table for a cut-off saw, a work supporting abutment member extending transversely of the top of said table, said table having a saw slot and two parallel clamp receiving slots, a pair of clamping jaws pivotally mounted on a shaft extending transversely of the table top and extending upwardly through said clamp slots for cooperation with said work holding abutment member, said jaw members having extensions beneath the table connected at the ends thereof to a pivot block, an aperture in said pivot block and a generally vertical rod slidable in the aperture in said pivot block, a compression spring between said pivot block and one end of said rod, the other end of said rod being connected to an eccentric which is journaled in a support on said table and a handle for rotating the eccentric.

9. A combination cut-off and deburring mechanism comprising a supporting frame, a supporting arm pivotally mounted intermediate its ends for tilting movement on the frame, a drive motor mounted at one end of said arm, a blade supporting shaft at the other end of said arm, a driving connection between one end of the motor shaft and the blade supporting shaft for operating the blade, a deburring mechanism mounted at the other end of the motor which includes a wire brush mounted on the end of the motor shaft, and a member adjacent the periphery of the wire brush and between the wire brush and the blade supporting shaft for supporting a work-piece to permit the operator to engage the cut end of the same with the wire brush.

10. In a cut-off mechanism having a supporting frame, a motor mounted on said frame, an arbor mounted on said supporting frame, a cut-off blade on said arbor, means connecting the arbor in driven relation with one end of the motor shaft, a deburring apparatus comprising a wire brush mounted on the other end of the motor shaft, a circular housing for enclosing the wire brush, said housing being provided with a peripheral opening extending in the direction of said cut-off blade whereby to permit the operator to cut off the work piece with said cut-off blade and to insert the cut-off end of the work-piece in said opening, and a cradle member adjacent said opening for supporting the work-piece while the cut-off end thereof is engaged with the wire brush for removing the burr thereon.

11. In a cut-off mechanism having a supporting frame, a motor mounted on said frame, an arbor mounted on said frame and spaced from said motor, a cut-off blade on said arbor and a driving connection between said arbor and one end of the motor shaft, a deburring apparatus comprising a wire brush mounted on the other end of the motor shaft and a cradle-like member adjacent the periphery of the wire brush which extends in the direction of said cut-off blade and which is positioned to support in generally horizontal relation the cut-off end of a work-piece whereby to permit the operator to cut off the end of a work piece with said blade and to engage the same with the periphery of the wire brush for removing the burr thereon.

References Cited in the file of this patent

UNITED STATES PATENTS

| | | |
|---|---|---|
| 1,076,022 | Conner | Oct. 21, 1913 |
| 1,209,041 | Ruggaber | Dec. 19, 1916 |
| 1,992,147 | Gordon | Feb. 19, 1935 |
| 2,031,052 | Lewis et al. | Feb. 18, 1936 |
| 2,107,566 | Gardner | Feb. 8, 1938 |
| 2,201,658 | Whitney | May 21, 1940 |
| 2,252,787 | Sarver | Aug. 19, 1941 |

FOREIGN PATENTS

| | | |
|---|---|---|
| 37,911 | Switzerland | Aug. 18, 1906 |
| 419,020 | Germany | Aug. 14, 1924 |